(12) United States Patent  
Dillon (10) Patent No.: US 7,143,863 B2  
(45) Date of Patent: Dec. 5, 2006

(54) ARTICULATED HARVESTER AND METHOD FOR CONVERTING A HARVESTER AND TOWED GRAIN TRAILER INTO AN ARTICULATED HARVESTER

(76) Inventor: Ben N. Dillon, 206 Greensprings Dr., Columbus, OH (US) 43235

( * ) Notice: Subject to any disclaimer, the term of this patent is extended or adjusted under 35 U.S.C. 154(b) by 159 days.

(21) Appl. No.: 10/379,957

(22) Filed: Mar. 5, 2003

(65) Prior Publication Data

US 2006/0156703 A1 Jul. 20, 2006

(51) Int. Cl.  
*B62D 53/00* (2006.01)

(52) U.S. Cl. ...................................... 180/418; 280/443

(58) Field of Classification Search ................ 180/418, 180/419; 280/443, 444, 459; 460/114  
See application file for complete search history.

(56) References Cited

U.S. PATENT DOCUMENTS 3,075,233 A * 1/1963 Lorenz ........................ 16/35 R
4,414,794 A * 11/1983 Riedinger ..................... 56/16.6
4,449,727 A * 5/1984 Roos ........................... 280/81.6
6,339,917 B1 * 1/2002 Dillon et al. ................. 56/14.6
7,077,220 B1 * 7/2006 Dunn et al. ................... 180/6.2

* cited by examiner

*Primary Examiner*—Thomas B. Will  
*Assistant Examiner*—Alicia Torres  
(74) *Attorney, Agent, or Firm*—Mueller Smith & Matto (57) ABSTRACT

An articulated harvester includes a powered harvester having a pair of forward wheels or tracks, having a pair of rotatable rearward caster wheels, and carrying an on-board harvester grain bin for housing harvested grain. The harvester tows a grain cart, which carries a grain cart bin for housing harvested grain. A joint assembly interconnects the harvester and the grain cart. The joint assembly includes a grain cart tongue that mates with the harvester. An articulation cylinder assembly connects the harvester and the grain cart tongue in the region of the joint assembly. Bi-directional, biased guide rods connect between the grain cart tongue and the caster wheels. The grain car may be steerable and/or powered. The harvester may be steerable by its pair of forward wheels or tracks. A conventional harvester and grain cart assembly can be converted into the novel articulated harvester.

29 Claims, 9 Drawing Sheets

ARTICULATED HARVESTER AND METHOD FOR CONVERTING A HARVESTER AND TOWED GRAIN TRAILER INTO AN ARTICULATED HARVESTER

CROSS-REFERENCE TO RELATED APPLICATIONS

None.

STATEMENT REGARDING FEDERALLY SPONSORED RESEARCH

Not applicable.

BACKGROUND OF THE INVENTION

The present invention generally relates to combines or harvesters that pull an integrated, often powered and steerable, grain trailer for extra storage capacity, and more particularly to a simple conversion thereof into an articulated harvester. For present purposes the term "harvester" will be used to include, inter alia, combines, corn pickers, harvesters, and like equipment that pick, harvest, or otherwise process grains in field. Often the term "combine" will be used herein; however, such use is by way of illustration and not by way of limitation.

Modern grain combines, such as are used to harvest corn, wheat, soybeans, etc., and corn pickers, have significantly increased their throughput capability. These increases have resulted from improvements such as wider cutting heads and increased number of row units per machine in the case of row crops such as corn. The threshing and grain separating capacity of the machines has increased in parallel by building larger machines with higher horsepower engines.

Concomitant therewith, the number of acres in the average North American farm has increased dramatically with crop fields becoming larger and longer. Fields with a row length of one-half mile have become quite common.

The result of these simultaneous trends is that the amount of harvested crop or clean grain produced in one round or two lengths of the field has increased dramatically. The harvested grain must be carried along by the harvesting system until the end of the field is reached where it is transferred into a bulk transportation vehicle such as a truck (tractor-trailer or semi) or wagon. Combines have an onboard grain hopper in which to store the harvested grain until the end of the field has been reached. Seed corn pickers typically pull a trailer or wagon, or a truck is driven along side them to receive the grain.

Due to increased combine throughput and long fields, virtually no combine commercially available today has sufficient capacity in its on-board hopper to store the corn harvested during one round of an 80 acre field or a field which is one-half mile in length with the crop yields typically found in the U.S. corn belt. The on-board primary storage hoppers are limited in capacity by the physical size of the machine and the total weight of the combine with a full hopper, which can be carried on 2 axles or 2 tracks in some cases.

Farmers and farm equipment manufacturers have addressed this problem by developing intermediate transport grain carts or trailers, which are pulled by a separate tractor and operator. The grain cart/tractor combination is stationed at the opposite end of the field from the road transport (bulk storage) vehicle or along the length of the field to receive the grain from the combine when its primary hopper is full and before the combine reaches the end of the field where the road transport vehicle is located. The traditional grain cart has self-unloading capability usually in the form of an auger, conveyor, or side hydraulic dump mechanism, which receives power from the tractor. The grain cart/tractor combination typically carries the grain to the end of the field and loads it into the road transport vehicle, such as a semi-truck. Examples of such grain wagons can be found in U.S. Pat. Nos. 5,013,208, 5,340,265, and 5,409,344.

Grain cart capacities typically vary from 400 bushels to 1000 bushels. Therefore, a loaded grain cart and pulling tractor may weigh as much as 90,000 pounds. Repeated trips across the field by this large vehicle combination can produce additional soil compaction, particularly in wet conditions, which reduces future crop yields. This method of intermediate storage and movement of grain with the field incrementally adds one operator and significant capital cost to the harvesting process.

In the field of trailers or wagons that are towed by a farm tractor or over-the-road tractor-trailers (so-called "semis"), U.S. Pat. No. 2,667,028 shows a towable combine with an attached grain cart. U.S. Pat. No. 4,460,193 shows a pull type swather assembly, which can be crabbed. U.S. Pat. No. 4,359,854 shows a tractor drawn combine, which also can be crabbed. U.S. Pat. No. 5,412,929 shows the ability to steer a pair of rakes being towed by a tractor. U.S. Pat. No. 5,579,228 shows a servo steering control system for a non-powered trailer that includes forward and backward motion. U.S. Pat. No. 5,209,320 shows an articulated crop pesticide sprayer adapted to be pulled. U.S. Pat. No. 4,740,006 proposes to retrofit existing tractor-trailers with a remote-control steering system. Finally, U.S. Pat. No. 5,329,451 proposes a steerable trailer and steering apparatus, which includes a servo control.

A significant advance in grain carts is disclosed in U.S. Pat. No. 5,904,365. Disclosed is a powered towing vehicle having steering wheels and a wheeled trailer is connected to the vehicle for its towing. The wheels of the trailer are connected to a source of power for generating forward and rearward movement of the trailer. These wheels also are connected to a source of power for turning such wheels in order to steer the trailer. These wheels further are connected to a sensor to sense the position of the trailer wheels as they are being steered. The steering wheels of the towing vehicle also are connected to a sensor to sense the position of the vehicle wheels as they are being steered. The trailer steering wheel sensor is displayed to an operator of the vehicle so that the vehicle operator knows the relative position of each of the steering wheels. The trailer steering power source is connected to the vehicle so that an operator of the vehicle can remotely steer the wheels of the trailer. Unloading of the grain takes place separately from both the combine hopper and from the grain cart.

An improved grain handling assembly for a combine and grain cart combination is disclosed in application Ser. No. 10/247,249, filed on Sep. 19, 2002, the disclosure thereof being expressly incorporated herein by reference.

Articulated combines can be found in U.S. Pat. Nos. 6,012,272, 6,125,618, 6,339,917, and subsequent divisional patents therefrom. Implementation of these articulated combines commercially requires new tooling and market acceptance; yet, the advantages of articulated vehicles is well known. The present invention, then, is addressed to retrofitting harvester/grain cart assemblies and converting them into articulated harvesters with the advantages attendant therewith. The present invention also is addressed to manufacturing (from scratch) such an articulated harvester as an original equipment item.

BRIEF SUMMARY OF THE INVENTION

An articulated harvester includes a powered harvester having a pair of forward wheels or tracks, having a pair of rotatable rearward caster wheels, and carrying an on-board harvester grain bin for housing harvested grain. The harvester tows a grain cart, which carries a grain cart bin for housing harvested grain. A joint assembly interconnects the harvester and the grain cart. The joint assembly includes a grain cart tongue that mates with the harvester. An articulation cylinder assembly connects the harvester and the grain cart tongue in the region of the joint assembly. Bi-directional, biased guide rods connect between the grain cart tongue and the caster wheels. The grain car may be steerable and/or powered. The harvester may be steerable by its pair of forward wheels or tracks. A conventional harvester and grain cart assembly can be converted into the novel articulated harvester.

The corresponding method for converting a combination of a powered harvester and a grain cart towed with the harvester into an articulated harvester commences by providing a combination of a powered harvester having a pair of forward wheels (or tracks) and a pair of rearward wheels, and a powered grain cart towed with the harvester. The harvester carries an on-board harvester grain bin for housing harvested grain and the grain cart carries a grain cart bin for housing harvested grain. The harvester rearward wheels are replaced with a pair of rotatable caster wheels. The harvester and the grain cart are interconnected with a joint assembly. The joint assembly includes a grain cart tongue that mates with the harvester. The harvester and the grain cart are connected with an articulation cylinder assembly in the region of the joint assembly. Finally, the grain cart tongue and the caster wheels are connected with bi-directional, biased guide rods.

Advantages of the present invention include the ability to convert a harvester and grain cart into an articulated harvester. Another advantage is that the conversion is simple and straightforward. A further advantage is that the conversion is not expensive. Yet another advantage is that the inventive conversion can be accomplished by ordinary mechanics in the harvester field. A yet further advantage is that such inventive design can be manufactured as an original item of manufacture. Another advantage is that that harvester can be disconnected from the grain cart and driven around separately. A further advantage is that owner of the modified harvester can sell it as a stand-alone harvester by simply installing a conventional axle and wheel assemblies in place of the caster wheel assemblies. These and other advantages will be readily apparent to those skilled in the art based on the disclosure set forth herein.

BRIEF DESCRIPTION OF THE DRAWINGS

For a fuller understanding of the nature and advantages of the present invention, reference should be had to the following detailed description taken in connection with the accompanying drawings, in which.

The drawings will be described in detail below.

DETAILED DESCRIPTION OF THE INVENTION

The present invention improves upon the grain cart and combine combination disclosed in U.S. Pat. No. 5,904,365. It also can employ the novel grain unloading and handling system disclosed in application Ser. No. 10/247,249 (cited above). Advantageously, the invention also can improve upon other prior art grain cart/combine combinations. Accordingly, the grain cart bogey of the novel articulated combine for present purposes comprehends a grain cart that is unpowered, is powered only, or is both powered and steerable. The harvester likewise may or may not be steerable, but is powered.

Figure 1:
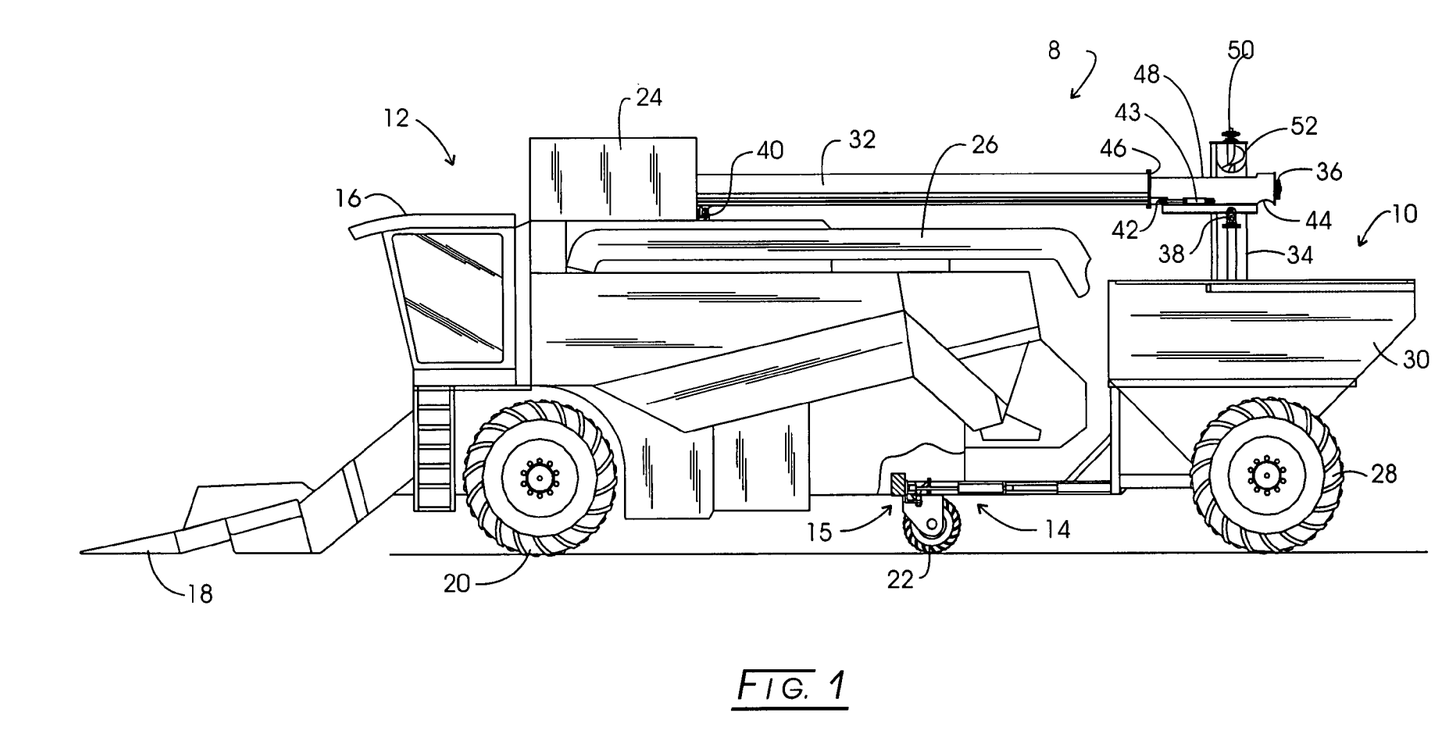
FIG. 1 is a side elevational view of the novel converted articulated combine (or harvester), which was formed from a conventional combine and towed grain cart.
Figure 2:
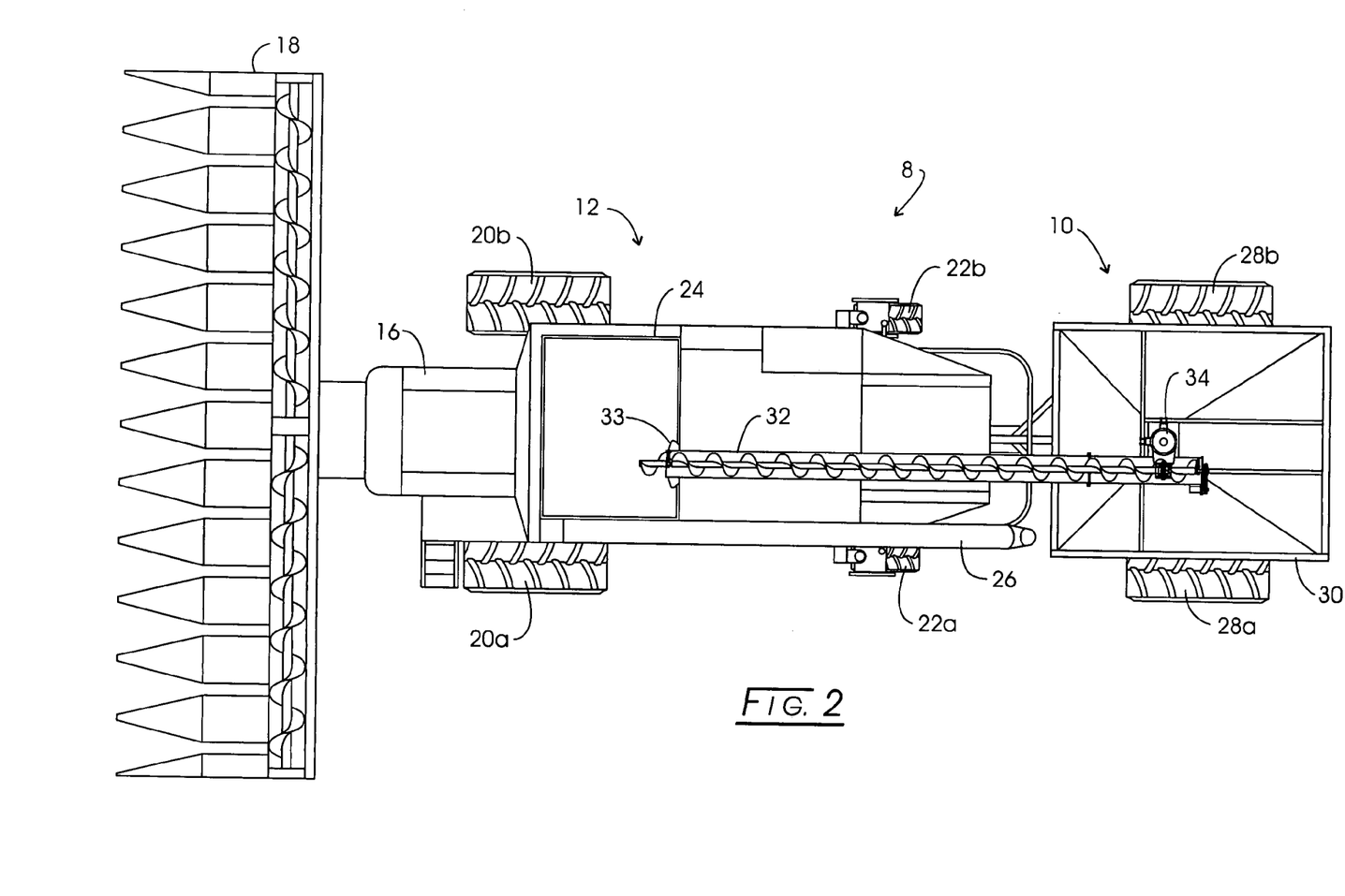
FIG. 2 is an overhead view of the novel articulated combine illustrated in FIG. 1.

Referring initially to FIG. 1, an articulated combine, 8, is seen formed from a grain cart, 10, and a combine, 12, which are mechanically interconnected by a joint assembly, 14. Combine 12 generally includes a cab, 16, in which the operator is seated, a cornhead, 18, a drive wheel pair, 20, a caster wheel pair, 22 (only one of each set of wheels being depicted in FIG. 1), a primary grain hopper or combine grain bin, 24, and an auger assembly, 26, for unloading hopper 24. Such combine is a modern combine with all of the appurtenances and features that combine manufacturers provide today, but for caster wheels 22, which replace a set of conventional wheels. Similarly, grain cart 10 is conventional in construction in that it includes a wheel pair, 28 (see FIG. 2 to view both wheel pairs 28a and 28b), a secondary grain hopper or grain cart bin, 30, and joint assembly 14, which is different than a conventional tongue that typically connects combine 12 with grain cart 10. Grain cart 10 is powered, preferably by extending the hydraulics from combine 12 to wheel pair 28. Wheel pair 28 optionally could be steerable, such as in the manner taught in U.S. Pat. No. 5,904,365.

It will be observed that the novel articulated combine, then, can be made by conversion of a combine/grain cart combination by replacing the combine rear wheels with caster wheels and by replacing the simple grain cart tongue with a joint assembly. Such simplicity adds to the value of the invention, as it is relatively easy to undertake such conversion.

The grain transfer assembly, 32, depicted in FIG. 1 is that novel grain transfer assembly as disclosed in application Ser. No. 10/247,249 (cited above). It will be appreciated that grain could be off-loaded separately from the combine grain bin 24 and from grain cart bin 30, such as is disclosed, for example, in U.S. Pat. No. 5,904,365. The particular method by which grain is off-loaded from articulated combine 8 is not a limitation on the present invention.

Figure 3:
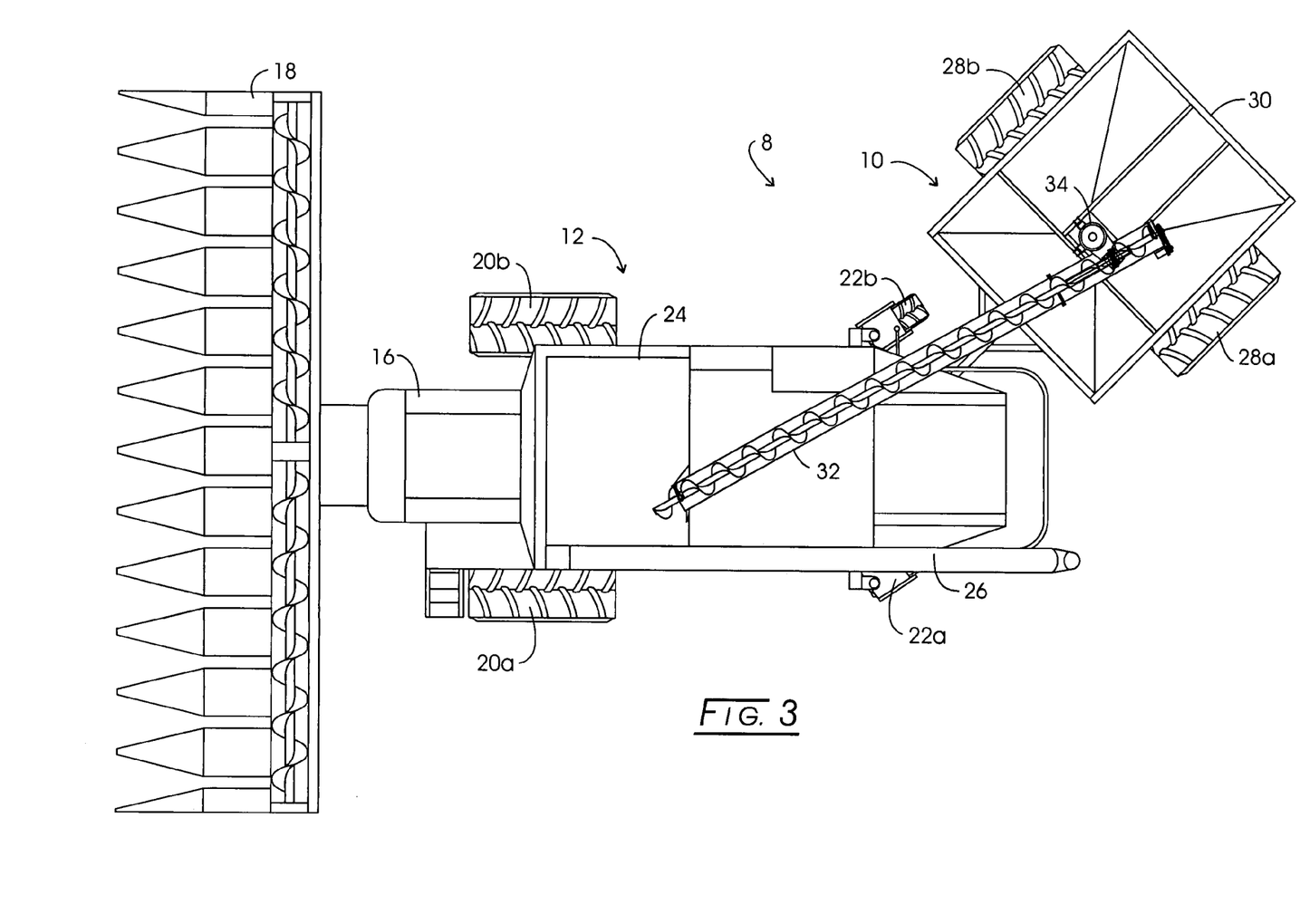
FIG. 3 is an overhead view of the novel combination when the articulated combine is making a right turn.

As disclosed in application Ser. No. 10/247,249, it will be observed that generally horizontal first grain transfer assembly 32 runs between combine grain bin 24 and grain cart bin 30. A generally vertical grain transfer assembly, 34, is seen to be located within grain cart bin 30 and is interconnected with first grain transfer assembly 32. Horizontal grain transfer assembly 32 is seen to extend into combine grain bin 24 through its rear wall (see FIG. 5) and vertically at about its midpoint. A canvas, rubber, or other suitable material seal, 33, keeps the harvested grain from spilling out, yet permits movement of assembly 32 during turning of the combine, as will be described below in connection with FIGS. 3 and 4. This location means that as soon as combine grain bin 24 is about one-half full, harvested grain housed in bin 24 can be withdrawn and transferred into grain cart bin 30. Conversely, by reversing the direction of travel of transfer assembly 32 grain can be transferred from grain cart bin 30 back into combine grain bin 24 for its unloading via unloading mechanism 26.

While the grain transfer assemblies can be conveyors, augers, or similar known devices (e.g., auger, bucket conveyor, cleated conveyor, or the like), the present invention will be specifically illustrated with (and not limited to) augers. Generally, a hydraulic motor assembly, 36, powers horizontal harvested grain transfer assembly (auger) 32 and is composed of a suitably sized hydraulic motor, chain, sprocket, and bearings. Auger assembly 32 is supported at its grain cart end by a joint, 38, and at its combine end by a joint, 40. Auger assembly 32 also is provided with a grain cart discharge door, 42, which is actuated by a hydraulic cylinder, 43, and with a rear discharge, 44, and with a shroud rotate joint, 46. Auger assembly 32 is shrouded or covered from joint 46 forward to combine grain bin 24 and is an open trough, 48, from joint 46 rearwardly. Harvested grain can be discharged from auger assembly 32 into grain cart bin 30 via discharges 42 and 44. Discharge of harvested grain into grain cart bin 30 is facilitated by this dual discharge scheme. Such scheme also means that discharge 44 is disposed rearwardly of vertical auger assembly 34.

Figure 12:
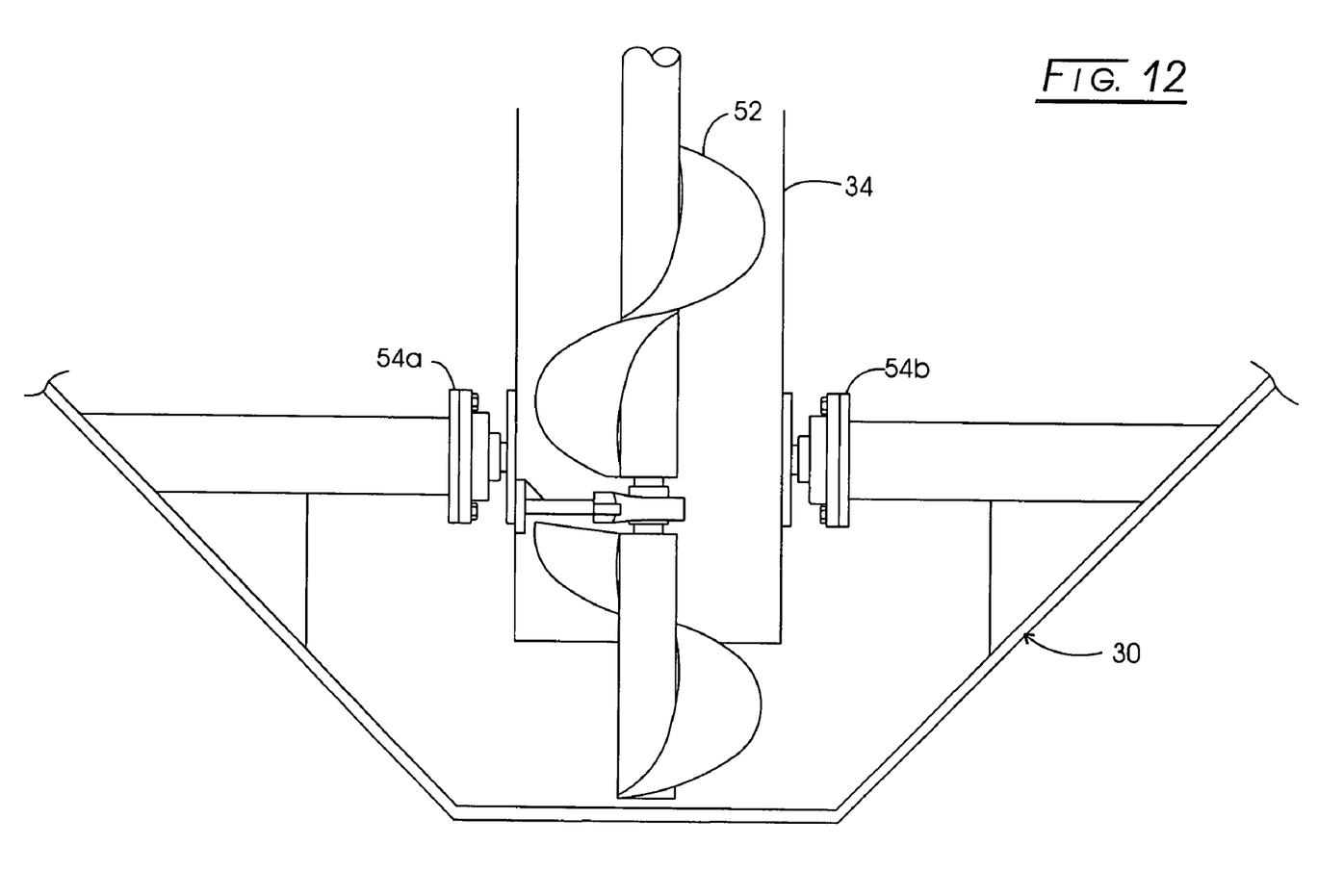
FIG. 12 a side elevational view of the trunnion mount for the vertical auger located within the grain cart bin.

A hydraulic motor assembly, 50, powers vertical auger assembly 34 and generally is composed of a suitably sized hydraulic motor, chain, sprocket, and bearings. Harvested grain housed in grain cart 30 is withdrawn from grain cart bin 30 by auger assembly 34 and discharged from a spout, 52, into open trough 48. Hydraulic motor 36 is reversible so that harvested grain can be reciprocally transported between combine grain bin 24 and grain cart bin 30, including the transfer of harvested grain from grain cart bin 30 back to combine grain bin 24. Vertical auger assembly 34 is mounted to grain cart bin 30 with a trunnion mount, 54 (see FIG. 12). Trunnion mount 54, composed of trunnion mount portions 54a and 54b, permits auger assembly 34 to be rotated rearwardly to rest on a side of grain cart bin 30 for storage.

Figure 4:
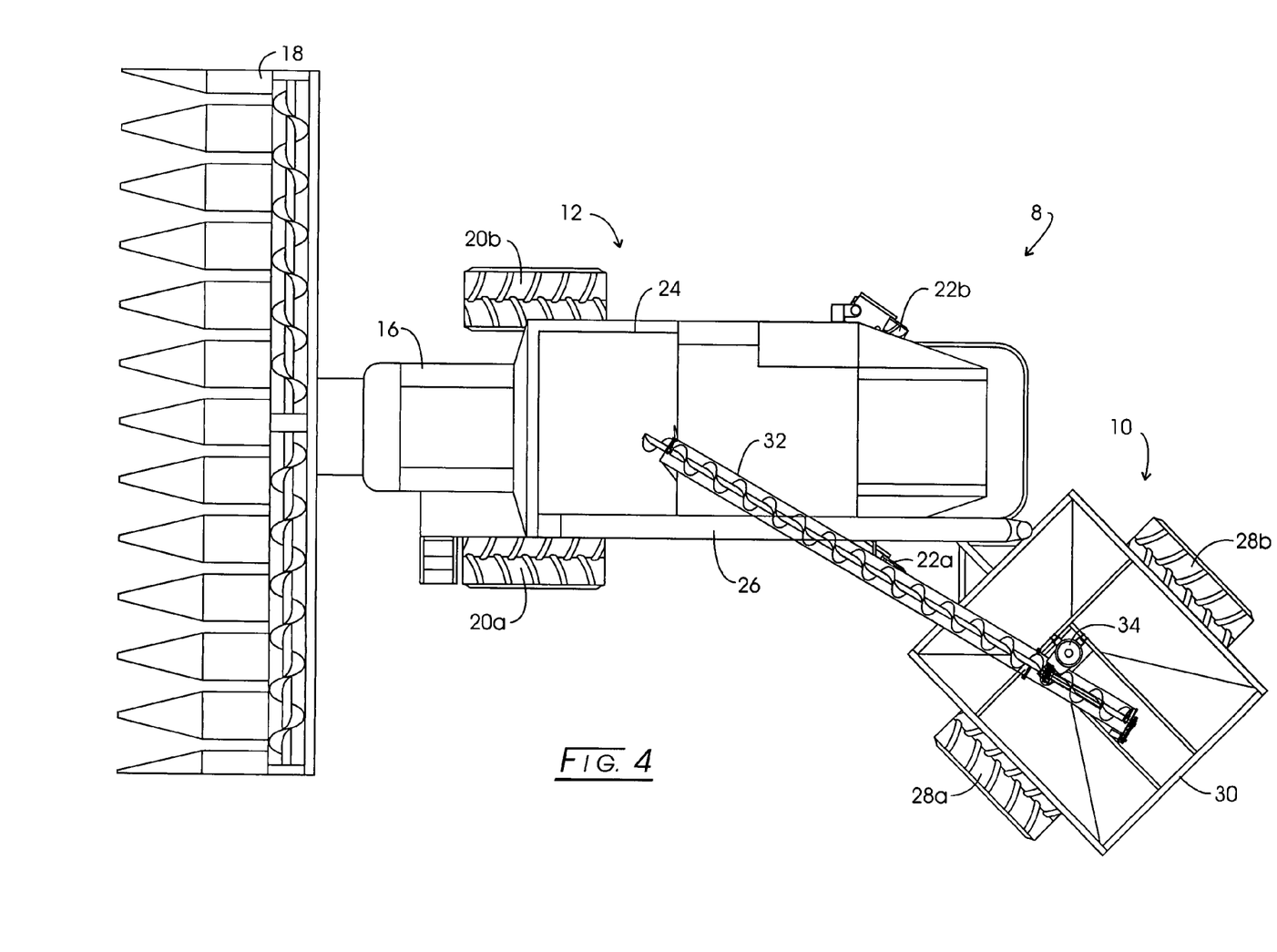
FIG. 4 is an overhead view of the novel combination when the articulated combine is making a left turn.

Attachment of auger assembly 32 at either end requires pivoting capability in order for the combine and towed cart to turn. This can be seen by reference to FIGS. 3 (right turn) and 4 (left turn). It will be apparent that if grain transfer assembly 32 cannot pivot that turning of articulated combine 8 cannot be accomplished. The flexibility of seal 17 also enables auger assembly 32 to pivot as it extends through the hole in the side of combine grain bin 24. Such pivoting also requires the hole in grain transfer assembly 32 to be large enough to accommodate turning of articulated combine 8 with consequent pivoting of auger assembly 32.

Figure 5:
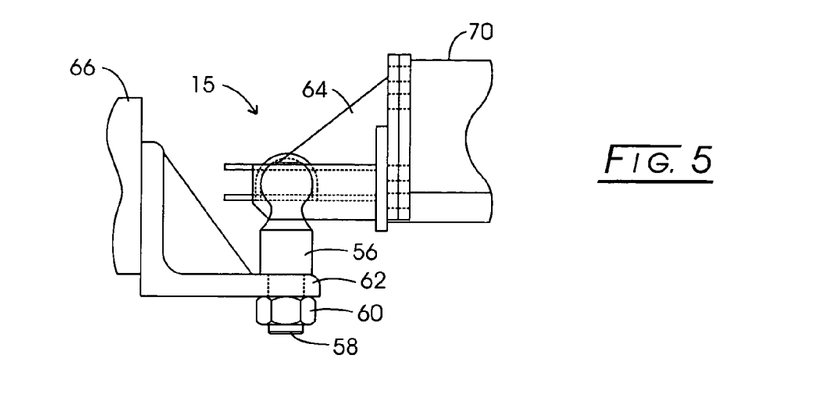
FIG. 5 is partial cut-away side elevational view of the joint connecting the forward bogey (former combine) with the rearward bogey (former grain cart) of the novel articulated combine.

Ball hitch assembly 15, illustrated in FIG. 5, enables articulated combine 8 to articulate. While a variety of hitches can be envisioned, ball hitch assembly 15 includes a tow ball, 56, with a threaded end, 58, retained by a nut, 60, to a bracket assembly, 62, attached to axle 66 at the rear of combine 10. Correspondingly, tongue 70 attached to grain cart 10 at its forward end carries a bracket assembly, 64, having a cavity that mates over tow ball 56 with a suitable locking mechanism to guard against the premature or unwanted separation of the hitch assembly 15. It will be appreciated that ball hitch assembly 15 may be require additional reinforcement in order to withstand the torque and moment placed on it when articulated combine 8 turns. Such design is well within the skill of the artisan with the particular design in FIG. 5 being for illustrative purposes only.

Figure 6:
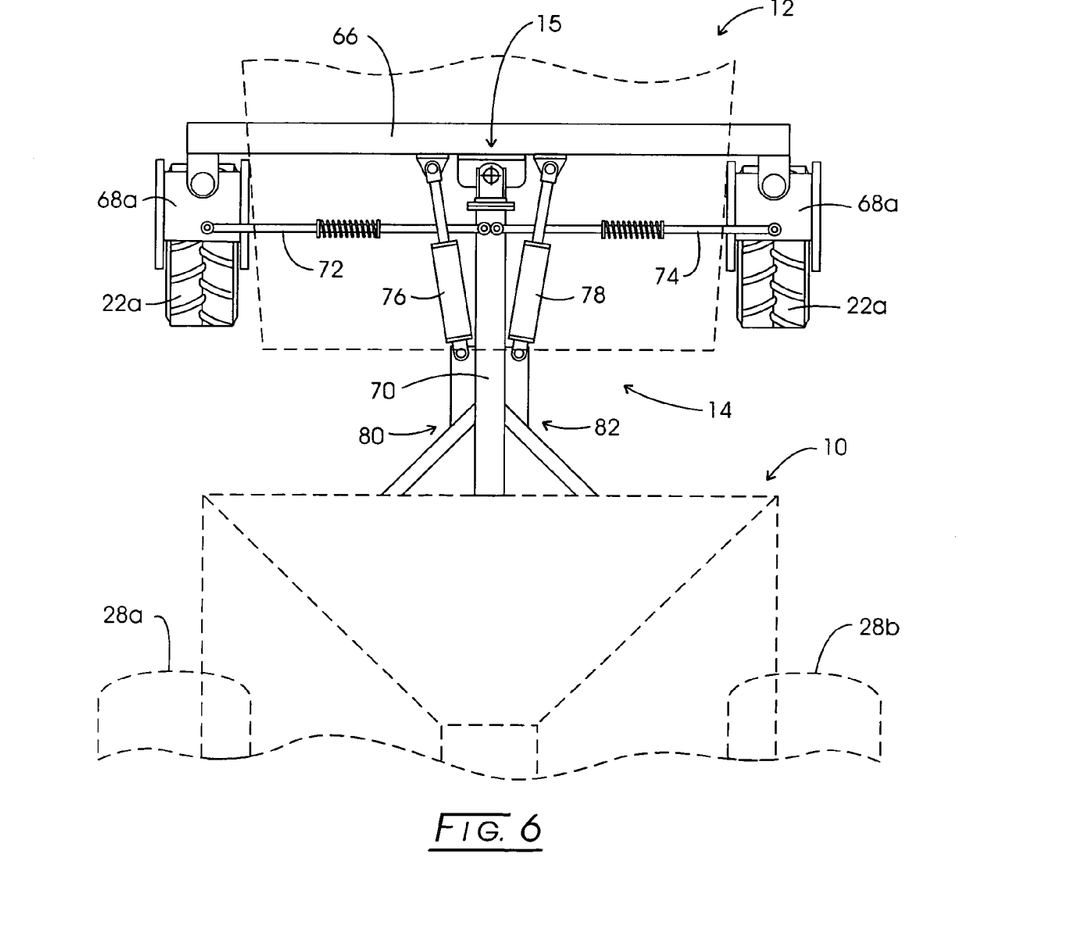
FIG. 6 is an overhead view of the articulation joint assembly connecting the joint connecting the forward bogey (original combine) with the rearward bogey (original grain cart) of the novel articulated combine.

FIG. 6 shows joint assembly 14 along with caster wheels 22a and 22b. It will be observed that each caster wheel 22a/22b is connected to an axle, 66, by a U-shaped wheel mounts, 68a and 68b (see also FIGS. 1–4). In particular, wheel mounts 68a and 68b are pivotally mounted to axle 66 to permit each caster wheel 22a/22b to freely rotate 360°. Each caster wheel assembly 22a/22b can be fitted with a suitable tire, such as, for example, a used aircraft tire.

It will be observed that hitch assembly 15 is connected to a tongue, 70, of grain cart 10. A drive around stub also could replace tongue 70, as will be described below in connection with FIGS. 8–10. Wheel mounts 68a/68b are seen connected to tongue 70 via a pair of bidirectional, biased guide rods, 72 and 74, respectively, biased with springs 71 and 73, respectively. Such guide rod springs bias caster wheels 22a/22b to be oriented for straight-line movement of articulated combine 8 and generally confine caster wheels 22a/22b to match the articulation angle. Biased guide rods 72 and 74 preclude combine 8 from jack-knifing, especially when backing up. The attachment points of guide rods 72 and 74 do not necessarily comply with the Ackerman Steering design rules as shown, but such attachment point locations, if necessary, can be calculated by the skilled artisan. Thus, the attachment points of guide rods 72 and 74 in the drawing is for illustration and teaching purposes and should not be taken as a limitation on the present invention. Also, biasing means other springs could be used as is necessary, desirable, or convenient.

In order to turn articulated combine 8, a pair or articulation cylinder assemblies, 76 and 78, are connected between grain cart tongue 70 and combine 12 (preferably to the axle/frame of combine 12). In order to accommodate the expected turning forces exerted by articulation assemblies 76 and 78, a pair bracket assemblies, 80 and 82, have reinforced tongue 70. Other reinforcing assemblies can be envisioned and are appropriate for use, as those skilled in the art will appreciate. While the rods of articulation assemblies 76 and 78 are seen connected to the frame of combine 12 and their corresponding cylinders to tongue 70, the reverse arrangement also can be used. Desirably, articulation assemblies 76 and 78 are hydraulically powered from the hydraulics typically provided for operation of combine 12. Suitable sizing of the hydraulic valve permits articulation assemblies 76 and 78 to be added to the hydraulic scheme, with perhaps increasing of the size of the hydraulic pump carried aboard combine 12. Also, control of articulation assemblies 76 and 78 has been extended into cab 16 for integration into the steering hydraulics. Suitable integration must account for any steering provided by wheel pair 28 of grain cart 10 and by wheel pair 20 of combine 12. Such integration can be accomplished, for example, by suitable hydraulic or electronic controls.

Figure 7:
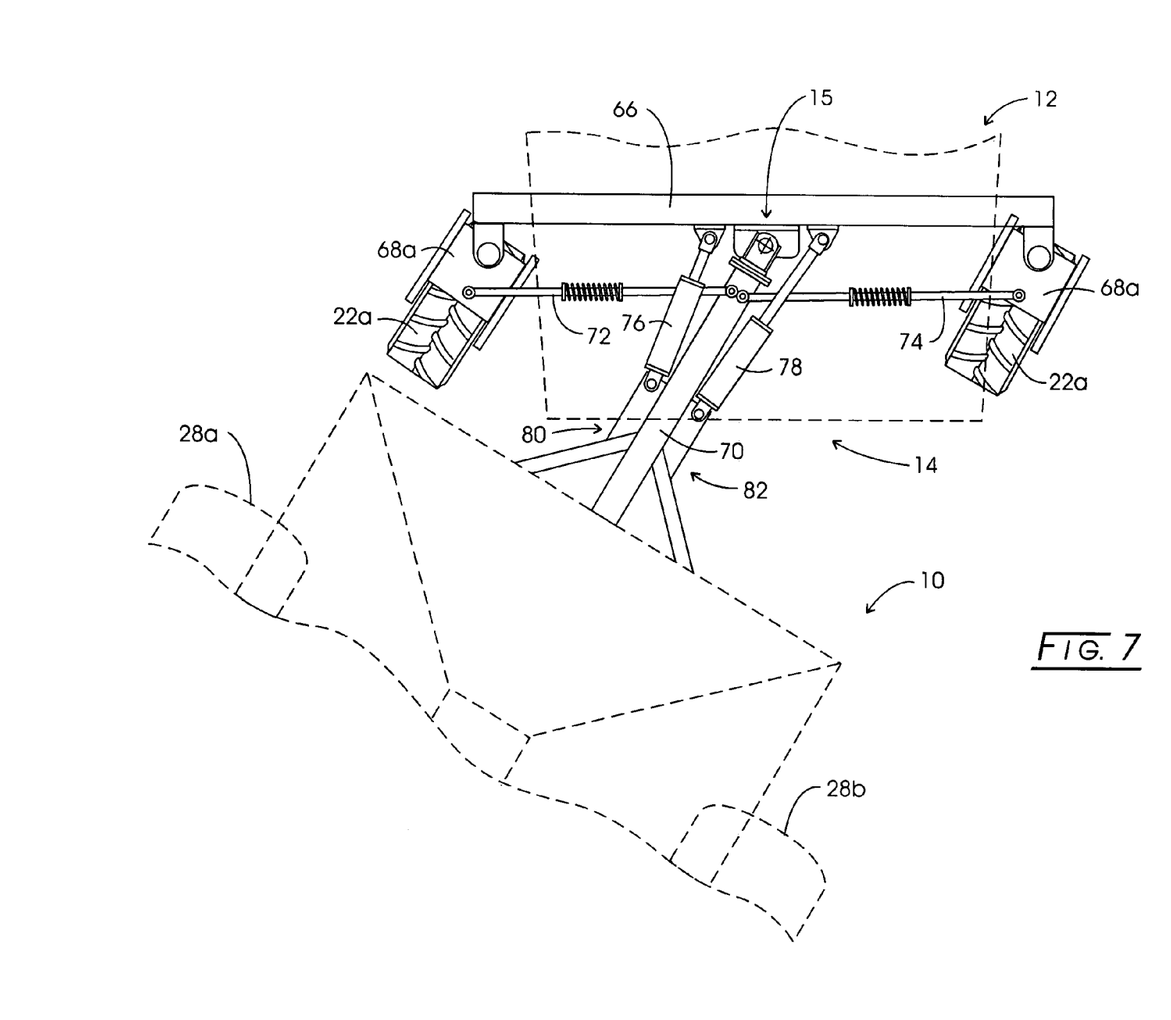
FIG. 7 is an overhead view of FIG. 6 while the articulated combine is being turned to the left.

In FIG. 7, articulation cylinder assembly 78 is seen extended and articulation cylinder assembly 76 is seen retracted in order for articulated combine 8 to turn to the left. It will also be observed that caster wheels 22a/22b have rotated to the right with guide rods 72 and 74 biasing their orientation to be the same with respect to tongue 70.

In summary, then, in order to convert combine 12 and towed grain cart 10 into articulated combine 8, the rear axle and wheels of combine 12 need to be replaced with axle 66 and wheel pair 22 carried by wheel mounts 68. Next, joint assembly 15 needs to be added along with articulation cylinder assemblies 76 and 78, and any required reinforcement of tongue 70. Of course, the drawings show two articulation cylinder assemblies for illustrative purposes only. Finally, the control of articulation cylinder assemblies 76 and 78 needs to be integrated into the steering control system for combine 12. With these few simple operations completed, an articulated combine has been manufactured from an existing combine and grain cart combination. As stated above, such harvester design also can be an original equipment manufacture.

Figure 8:
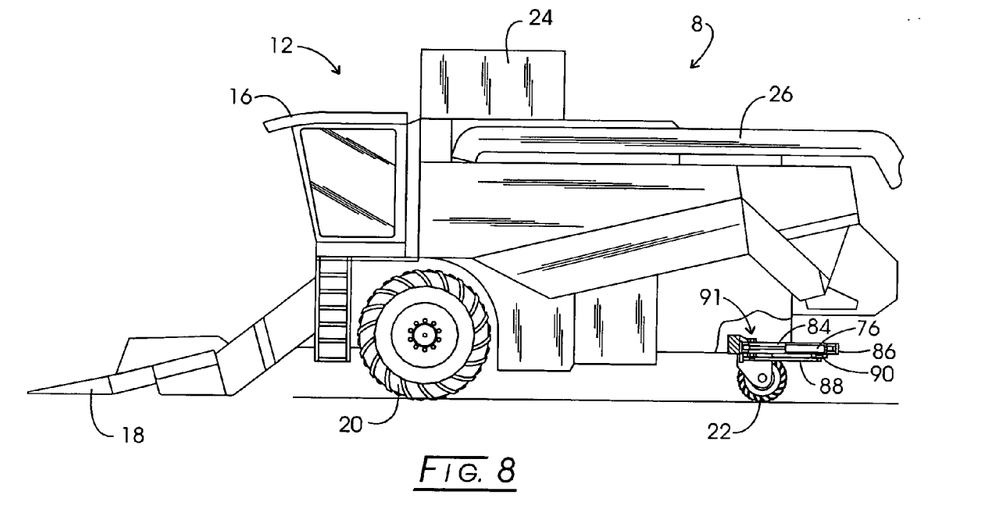
FIG. 8 is a side elevational view of the combine of FIG. 1 detached from the grain cart.
Figure 9:
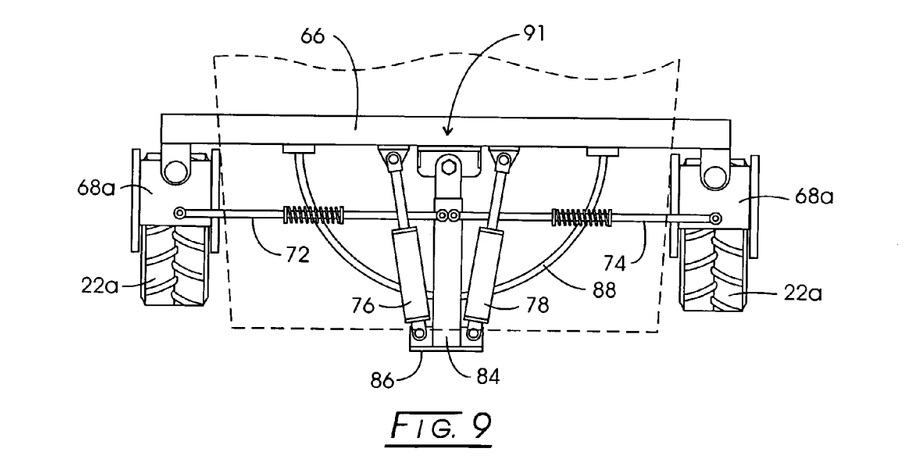
FIG. 9 is a overhead view of the joint assembly configured for the combine to be mobile detached from the grain cart.
Figure 10:
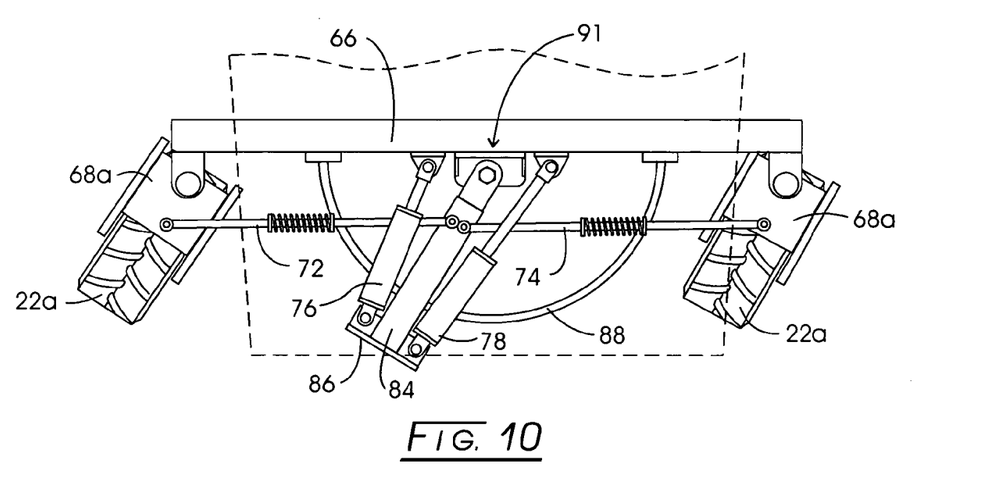
FIG. 10 is an overhead view like that in FIG. 9 with the combine being turned to the left.

Since the inventive articulated harvester design has rear caster wheel pair 22, it would be advantageous if grain cart 10 could be uncoupled from combine 12 and combine 12 still driven around, at least for short distances. FIGS. 8–10 detail how this can be accomplished. Referring initially to FIGS. 8 (in which the joint area is cut-away) and 9, in order to uncouple grain cart 10 from combine 12, tongue 70 first is uncoupled from hitch assembly 15 and replaced with a stub tongue, 84, whose free end carries a capture plate, 86. The free ends of cylinder assemblies 76 and 78 are attached to capture plate 86 so that the free ends of stub tongue 84 and cylinder assemblies 76 and 78 moved in unison about their respective pivotal attachments to combine 12. Biased guide rods 72 and 74 are disconnected from tongue 70 and re-connected to stub tongue 84. Next, a support ring, 88, is attached to axle 66 to provide support for stub tongue 84, biased guide rods 72 and 74, and cylinder assemblies 76 and 78. A roller, 90, is attached to the bottom of stub tongue 84 and it rides on the top surface of support ring 88. Such support and motion will be seen in FIG. 10 in which combine 12 is being turned to the left.

Figure 11:
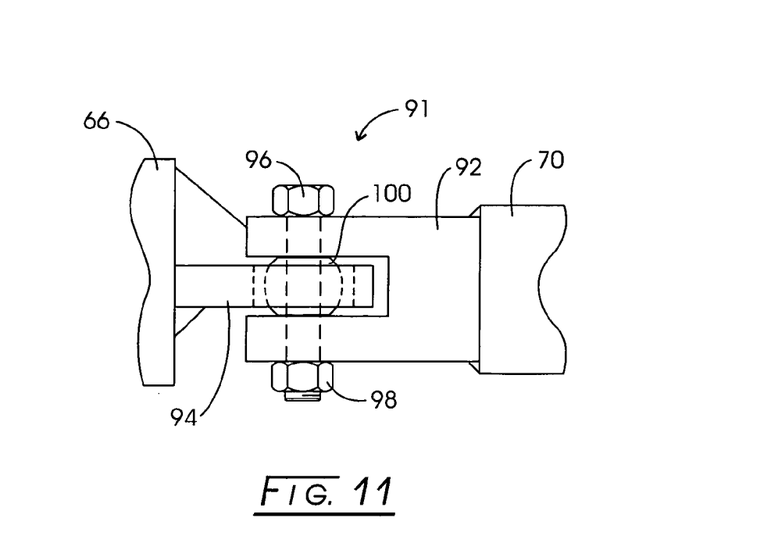
FIG. 11 is a partial cut-away side elevational view of an alternative hitch design.

FIG. 11 depicts an alternative hitch, 91, design in which tongue 70 has an apertured U-shaped bar stock, 92, which accepts an apertured plate, 94, carried by and gusseted to combine axle 66. A through bolt, 96, and nut, 98, secure bar stock 92 to plate 94. The aperture in plate 94 carries a spherical bearing, 100, such as an Aurora LCOM 24 spherical bearing (Aurora Bearing Company, Aurora, IL), which allows about ±7° roll and pitch to through bolt 96. Rotation about through bolt 96 adds the third degree of movement about hitch 91.

While the invention has been described with reference to preferred embodiments, those skilled in the art will understand that various changes may be made and equivalents may be substituted for elements thereof without departing from the precepts of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

I claim:

1. In a combination of a powered harvester and a grain cart towed with said harvester, said harvester having a pair of forward wheels or tracks, and a pair of rearward wheels, and carrying an on-board harvester grain bin for housing harvested grain, and said grain cart carrying a grain cart bin for housing harvested grain, the improvement comprising:
   (a) said harvester having a pair of forward wheels or tracks, and a pair of rotatable rearward caster wheels;
   (b) a joint assembly interconnecting said harvester and said grain cart, said joint assembly including a grain cart tongue that mates with said harvester;
   (c) an articulation cylinder assembly connecting said harvester and said grain cart tongue in the region of said joint assembly; and
   (d) bi-directional, biased guide rods connected between said grain cart tongue and said caster wheels,
whereby said combination is an articulated harvester.

2. The articulated harvester of claim 1, wherein said rearward caster wheels are fitted with used aircraft tires.

3. The articulated harvester of claim 1, wherein said joint assembly includes a ball and hitch assembly.

4. The articulated harvester of claim 1, wherein said joint assembly includes a spherical bearing assembly.

5. The articulated harvester of claim 1, wherein two articulation cylinder assemblies connect said harvester with said grain cart tongue.

6. The articulated harvester of claim 1, wherein said grain cart also is one or more of steerable or powered.

7. The articulated harvester of claim 1, wherein harvested grain is transferred between said harvester grain bin and said grain cart bin and off-loaded by:
   (a) a generally horizontally disposed first grain movement assembly pivotally connected within said harvester grain bin and pivotally connected within said grain cart bin and disposed for reciprocally transporting grain between said harvester grain bin and said grain cart bin;
   (b) a generally vertically disposed second grain movement assembly cooperatively operable with said first grain movement assembly for transferring grain from said grain cart bin to said first grain movement assembly and thence to said harvester grain bin; and
   (c) an off-loading grain movement assembly disposed for off-loading grain only from said harvester grain cart.

8. The articulated harvester of claim 1, wherein said combine is steerable with said pair of forward wheels or tracks.

9. A method for converting a combination of a powered harvester and a grain cart towed with said harvester into an articulated harvester, which comprises the steps of:
   (a) providing a combination of a powered harvester having a pair of forward wheels or tracks, and a pair of rearward wheels, and a grain cart towed with said harvester, said harvester carrying an on-board harvester grain bin for housing harvested grain and said grain cart carrying a grain cart bin for housing harvested grain;
   (b) replacing the harvester rearward wheels with a pair of rotatable caster wheels;

(c) interconnecting said harvester and said grain cart with a joint assembly, said joint assembly including a grain cart tongue that mates with said harvester;

(d) connecting said harvester and said grain cart with an articulation cylinder assembly in the region of said joint assembly; and (e) connecting said grain cart tongue and said caster wheels with bi-directional, biased guide rods.

10. The method of claim 9, wherein said rearward caster wheels are fitted with used aircraft tires.

11. The method of claim 9, wherein said joint assembly includes a ball and hitch assembly.

12. The method of claim 9, wherein said joint assembly includes a spherical bearing assembly.

13. The method of claim 9, wherein two articulation cylinder assemblies connect said harvester with said grain cart tongue.

14. The method of claim 9, wherein said grain cart is one or more of steerable or powered.

15. The method of claim 9, wherein harvested grain is transferred between said harvester grain bin and said grain cart bin and off-loaded by:

(a) a generally horizontally disposed first grain movement assembly pivotally connected within said harvester grain bin and pivotally connected within said grain cart bin and disposed for reciprocally transporting grain between said harvester grain bin and said grain cart bin;

(b) a generally vertically disposed second grain movement assembly cooperatively operable with said first grain movement assembly for transferring grain from said grain cart bin to said first grain movement assembly and thence to said harvester grain bin; and (c) an off-loading grain movement assembly disposed for off-loading grain only from said harvester grain cart.

16. The method of claim 9, wherein said combine is steerable with said pair of forward wheels or tracks.

17. A powered harvester bogey of an articulated harvester assembly formed from said harvester bogy connected to a grain cart bogey by a pivotal joint assembly that includes a grain cart bogey tongue and an articulation cylinder assembly, said powered harvester bogey detached from the grain cart bogey comprising:

(a) said harvester bogey having said articulation cylinder assembly pivotally attached thereto, said articulation cylinder assembly having a free end detached from said grain cart bogey, said grain cart bogey tongue being detached from the harvester bogey, said harvester bogy having a pair of rotatable rearward caster wheels;

(b) a stub tongue having a bottom side and being pivotally affixed to said harvester bogey to replace said grain cart bogey tongue, said stub tongue bearing a roller assembly on said stub tongue bottom side, and bearing a capture plate to which said articulation cylinder assembly free end is affixed;

(c) a semi-circular support ring attached to said harvester bogey upon which said roller assembly rests; and (d) bi-direction biased guide rods connected between said stub tongue and said caster wheels, wherein said harvester bogey is drivable detached from the grain cart bogey.

18. The powered harvester bogey of claim 17, wherein said harvester has a pair of forward wheels or tracks.

19. The powered harvester bogey of claim 17, wherein said rearward caster wheels are fitted with used aircraft tires.

20. The powered harvester bogey of claim 17, wherein two articulation cylinder assemblies connect said harvester with said grain cart tongue.

21. The powered harvester bogey of claim 17, wherein said combine is steerable with said pair of forward wheels or tracks.

22. An articulated harvester, which comprises:

(a) a powered harvester having a pair of forward wheels or tracks, having a pair of rotatable rearward caster wheels, and carrying an on-board harvester grain bin for housing harvested grain;

(b) a grain cart towed with said harvester and carrying a grain cart bin for housing harvested grain;

(c) a joint assembly interconnecting said harvester and said grain cart, said joint assembly including a grain cart tongue that mates with said harvester;

(d) an articulation cylinder assembly connecting said harvester and said grain cart tongue in the region of said joint assembly; and (e) bi-directional, biased guide rods connected between said grain cart tongue and said caster wheels.

23. The articulated harvester of claim 22, wherein said rearward caster wheels are fitted with used aircraft tires.

24. The articulated harvester of claim 22, wherein said joint assembly includes a ball and hitch assembly.

25. The articulated harvester of claim 22, wherein said joint assembly includes a spherical bearing assembly.

26. The articulated harvester of claim 22, wherein two articulation cylinder assemblies connect said harvester with said grain cart tongue.

27. The articulated harvester of claim 22, wherein said grain cart also is one or more of steerable or powered.

28. The articulated harvester of claim 22, wherein harvested grain is transferred between said harvester grain bin and said grain cart bin and off-loaded by:

(a) a generally horizontally disposed first grain movement assembly pivotally connected within said harvester grain bin and pivotally connected within said grain cart bin and disposed for reciprocally transporting grain between said harvester grain bin and said grain cart bin;

(b) a generally vertically disposed second grain movement assembly cooperatively operable with said first grain movement assembly for transferring grain from said grain cart bin to said first grain movement assembly and thence to said harvester grain bin; and (c) an off-loading grain movement assembly disposed for off-loading grain only from said harvester grain cart.

29. The articulated harvester of claim 22, wherein said combine is steerable with said pair of forward wheels or tracks.

* * * * *